Figure 1:
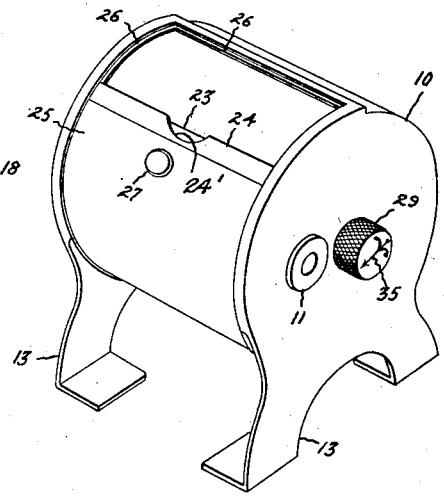

May 9, 1939.  R. E. WORSTELL  2,157,878

SYNCHRONIZATION TESTING DEVICE

Filed Jan. 2, 1937  2 Sheets-Sheet 1

Inventor:
Robert E. Worstell,
by Harry E. Dunham
His Attorney.

May 9, 1939.    R. E. WORSTELL    2,157,878
SYNCHRONIZATION TESTING DEVICE
Filed Jan. 2, 1937    2 Sheets-Sheet 2

Inventor:
Robert E. Worstell
by Harry E. Dunham
His Attorney.

Patented May 9, 1939

2,157,878

UNITED STATES PATENT OFFICE 2,157,878

SYNCHRONIZATION TESTING DEVICE

Robert E. Worstell, Cleveland Heights, Ohio, assignor to General Electric Company, a corporation of New York Application January 2, 1937, Serial No. 118,734

4 Claims. (Cl. 234—36)

My invention relates to apparatus for determining the relative degree of synchronization between the opening of a camera shutter and the light emitted by a flash-producing means.

Devices for synchronizing a camera shutter and flash lamp are known which automatically open the camera shutter preferably after initial ignition of the flash lamp, in order to allow the flash lamp to reach substantially maximum brightness just as the camera shutter is opened. The synchronizing device is essentially a lag device absorbing the differences in the lag periods of the camera shutter and the flash lamp and has but an extremely minute time interval in which to operate; consequently adjustment of the synchronizer, at high shutter speeds, is extremely delicate and some means must be used to show the relative degree of synchronization for purposes of adjustment. Because of the difficulty experienced, the synchronizers are usually adjusted to the particular camera on which they are used at the place of manufacture and any minor adjustment made thereafter due to changes in the operation of the camera shutter are made by trial.

Prior to my invention, actual readings were made of the time required for the synchronizer and camera shutter to operate and, by comparing these readings with the lag period of the flash lamp, the proper adjustment was finally secured. Equipment for measuring the time intervals is of laboratory nature and relatively expensive. My device on the other hand is very inexpensive and makes an accurate, permanent record of the operation of the camera shutter and flash lamp in such a manner as to show definitely whether the synchronizer is operating correctly or too fast or slow. In addition, my device is small, portable and impossible to get out of adjustment.

According to my invention, the relative degree of synchronization between the camera shutter and the flash lamp is determined by positioning the camera shutter to intercept a continuous beam of light which normally would strike a portion of a sensitized film and positioning the flash lamp so that its rays will strike a different portion of the film. Then the flash lamp is ignited and the synchronizer operates to open the camera shutter while there is a relative movement between the light beams and the film so that the respective beams of light passing through the opened shutter and issuing from the flash lamp form a permanent record upon the film. According to my invention, I preferably provide a rotatable drum having aligned slits therein through which the light beams are projected upon a stationary film to make a record of the flashing of the flash lamp and the opening of the camera shutter. Further features and advantages of my invention will appear from the following description of a species thereof.

Figure 2:
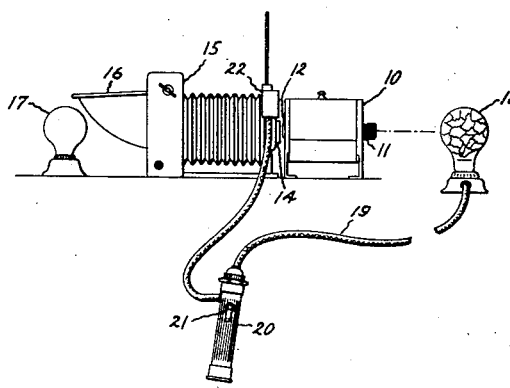
Figure 4:
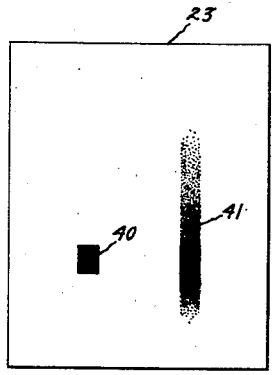
Figure 3:
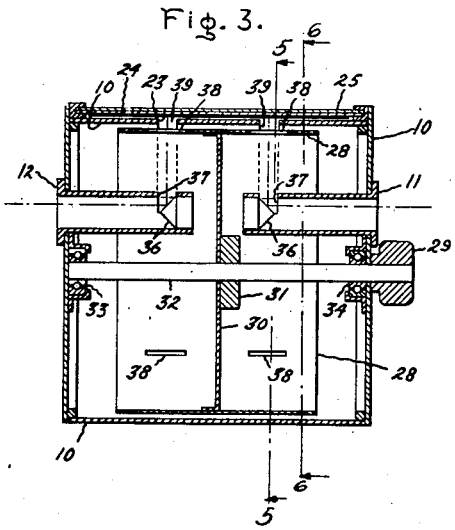
Figure 5:
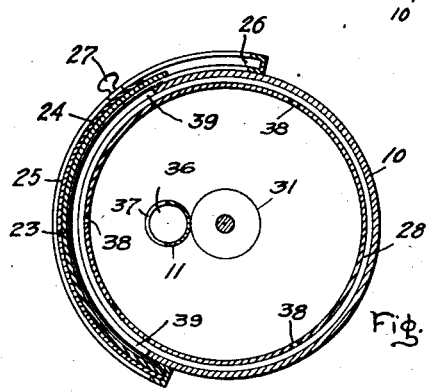
Figure 6:
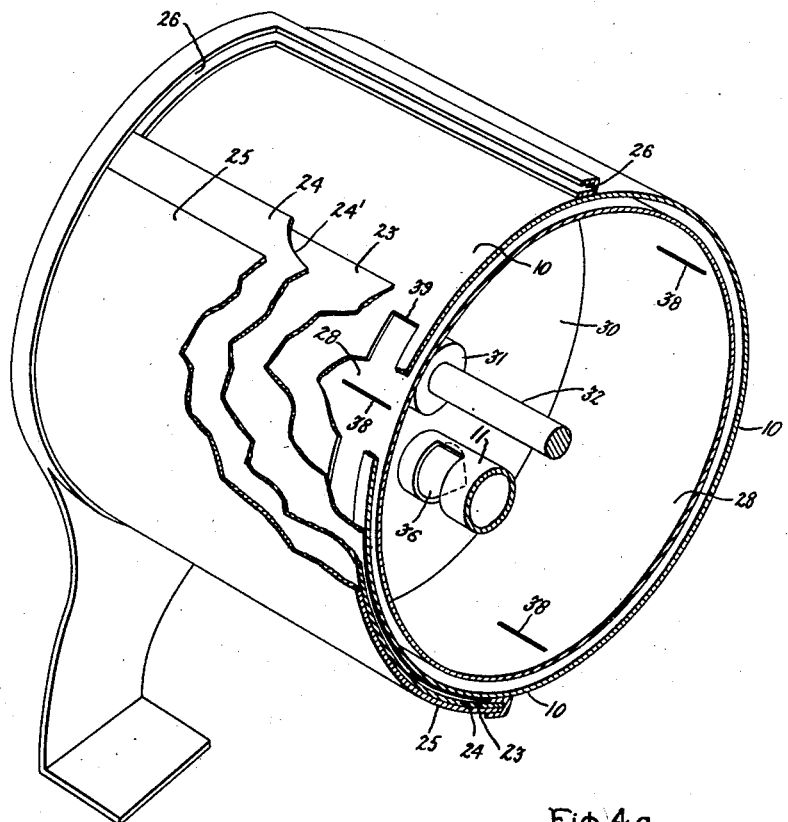
Figure 4B:
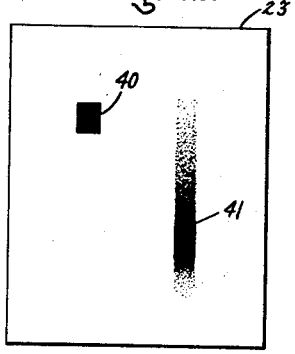
Figure 4A:
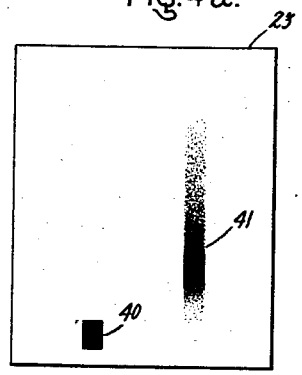

In the drawings, Fig. 1 is a perspective view of a form of device for practicing my invention; Fig. 2 is a side elevation of said device in operative relation to the camera, flash lamp and other apparatus necessary for a test; Fig. 3 is a horizontal section of the upper half of the device; Fig. 4 is a plan view of an exposed film, the result of a test using my device and showing the record produced by a synchronized lamp and shutter; Figs. 4a and 4b show the record produced on a film by a non-synchronized lamp and shutter; Fig. 5 is a section taken on the line 5—5 of Fig. 3; and Fig. 6 is another perspective view, partly in section, of the testing device, the section being taken along the line 6—6 of Fig. 3.

Referring to the drawings, the device shown therein consists of a cylindrical housing 10 having flanged tubes 11 and 12 attached to the ends thereof and extending inwardly and having legs 13 for support. The device, as shown in Fig. 2, is placed before the shutter 14 of a camera 15 preferably as near thereto as possible and in line with one of the tubes, tube 12 in this instance. The back 16 of the camera 15 is opened so that the ground glass focusing screen in this instance is brought to view and a lamp 17 having a high light intensity, such as the so-called "Photoflood" lamp produced by my assignee, is placed in front of the screen. If desired, the screen may be removed. With other types of cameras it may be necessary to make other arrangements so that the light from the lamp 17 reaches the shutter mechanism. The flash lamp 18 is preferably placed some distance (two feet for instance) from the other end of the device and is connected by a extension cord 19 to the socket in a battery case 20 in which the flash lamp is usually mounted. The battery case 20 is provided with a switch 21 for closing the circuit to the flash lamp 18 and to the synchronizer 22 which actuates the shutter 14 of the camera 15. The said synchronizer may be, for example, of the type shown in Patent 1,968,597, H. D. Blake, although other types available on the market may be employed.

To make a test with my device, said device is first taken into a dark room loaded with a sheet of photographic film or other light sensitized material. The film 23 is inserted in the space between a plate 24 and the housing 10 after a door 25 has been slid back in grooves 26 in said housing 10 to the position shown in Figs. 1, 5 and 6 by means of a knob 27. A film-retaining pocket is formed by the space between the plate 24 and the housing 10 which is completely closed to extraneous light when the door 25 is slid back into its closed position by a partial clockwise rotation in Figs. 1 and 5. The film 23 is shown in Figs. 1 and 5 in the position it occupies when fully inserted in the said pocket, the said plate 24 being notched at 24' to enable the operator to push the film to its fully enclosed position with his finger. Once loaded, the device is placed in position before the camera 15, as shown, and a drum 28 within the housing is caused to rotate by spinning a knob 29. The drum 28 is attached by means of a disc 30 and collar 31 to a shaft 32 which extends axially through the housing 10 and carries the knob 29. The shaft 32 is mounted in ball bearings 33 and 34 which are supported by the housing 10 and, with the drum 28 and other parts, has sufficient moment of inertia to continue turning for a considerable period after once being started. An arrow 35 may be engraved on the knob 29 or some other means provided to give some visual indication of the speed of rotation of the hollow cylinder 28. With the particular size and construction of the device shown, best results are obtained when the drum 28 rotates at approximately one turn per second and therefore the flash lamp 18 and synchronizer 22 are not operated until the said drum 28 slows down to this speed. This is done in this instance by closing the switch 21 on the battery case 20 and in a very short interval the light is given off by the flash lamp 18 and the camera shutter 14 is opened and closed.

The light from the lamps 17 and 18 enters the respective tubes 12 and 11 in the housing, strikes the conical reflecting surfaces of plugs 36 in the said tubes 12 and 11 and is redirected so as to pass laterally outward and toward the inner surface of the drum 28. The plugs 36 in this instance are made of metal and have a highly polished chromium surface. The inner ends of the tubes 11 and 12 are cut away at 37 so as to allow the light to strike only 180° of the drum 28 and are coated with a black light-absorbing paint so as to eliminate stray light from reflections. In this instance, the drum 28 is provided with two aligned sets of three equidistantly spaced slits 38, one set of slits being located in each of the areas struck by the light beams from the lamps 17 and 18, so that during the rotation one slit in each set will always be opposite the area in which the film 23 is located. The film 23 occupies a space of about 120° and is located over a portion of the housing 10 which is circumferentially slotted at 39 to permit the light passing through the slits 38 in the drum 28 to strike said film 23. The film 23 is exposed in the areas 40 and 41 as shown in Fig. 4 and must be removed from the device and developed and fixed before it may be inspected. In the particular instance shown, one pair of slits 38 in the drum 28 happened to be in such a position during the test that the exposed areas 40 and 41 were located near the center of the film 23. In other words, during the entire period of the flash only one of the slits 38 in each set of three was opposite a slot 39 in the casing 10 (see Fig. 5). However, this is not always the case and the areas 40 and 41 may be so displaced that a portion thereof appears at one end of the film 23 and the remainder appears at the other end. The exposed area 40 indicates the period in which the camera shutter 14 was open and should be directly opposite the well-exposed portion of area 41 if the shutter 14 and flash lamp 18 are properly synchronized. If the synchronizer is operating too rapidly, the area 40 will appear more toward the lower edge of the film 23 as shown in Fig. 4a whereas if it is operating too slowly, the area 40 will be up farther on the film and nearer the tail of the other area 41, as shown in Fig. 4b.

In operation, the device is set in front of the camera 15 with the tube 12 in alignment with the shutter 14, and the flash lamp 18 is set in front of the other tube 11, at a distance of about two feet, for example. The drum 28 is then revolved by a twist of the knob 29 and when it has slowed down to a speed of about one revolution per second, the switch 21 is closed, thereby actuating the synchronizer 22 which in turn opens the shutter 14, and also causing the lamp 18 to flash. Light from the continuously burning lamp 17 passes through the shutter 14, while it is open, through the tube 12 and is reflected at right angles by the conical surface of plug 36, through the slot 37 in said tube 12, through one (or two, depending upon their position) of the left hand slits 38 (Fig. 3) in the revolving drum 28 and through the left hand circumferential slot 39 upon the film 23, thus exposing the area 40 (Fig. 4) of the said film. In like manner, light from the flash lamp 18 enters tube 11 and is reflected by the plug 36 therein through the slot 37, right hand slit or slits 38 (Fig. 3), and right hand slot 39 upon the film 23 to expose the area 41 of the film.

What I claim as new and desire to secure by Letters Patent of the United States is:

1. In a device of the type described, a cylindrical housing, a rotatable cylindrical drum journaled in the enclosing end walls of said housing with its axis coincident with the axis of said housing, said drum having spaced axially extending and angularly aligned slits in its surface, means in said hosing for holding a sensitized film adjacent to the outer surface of said drum, a tube extending axially inward within said drum from an opening in each end wall of said housing, and reflecting means mounted in each of said tubes at a position laterally opposite one of said slits in said drum and adapted to reflect through said slit a light beam entering its respective tube.

2. In a device of the type described, a cylindrical housing, a rotatable cylindrical drum journaled in the enclosing end walls of said housing with its axis coincident with the axis of said housing, said drum having spaced axially extending and angularly aligned slits in its surface, means in said housing for holding a sensitized film adjacent to the outer surface of said drum, a tube extending axially inward within said drum from an opening in each end wall of said housing, and a conical mirror mounted in each of said tubes adjacent to a slot therein located at a position laterally opposite one of said slits in said drum, said mirror being adapted to reflect through said slit a light beam entering its respective tube.

3. A device of the type described comprising a rotatable cylindrical drum having a pair of spaced axially extending and angularly aligned slits therein, a shaft attached to and extending through said drum and adapted to cause said drum to be rotated, a housing surrounding and supporting said drum through engagement with the shaft and having a pair of circumferentially extending slots therein adjacent the path of movement of the slitted portions of said drum, a holder for a sheet of sensitized film mounted on the housing over the slotted portions thereof and excluding all light except that which enters through the said slots, a light tight door on the holder for permitting the insertion and removal of the sheet of sensitized film, a tube extending axially inward within said drum from an opening in each end wall of said housing, and reflectors mounted in the inner ends of said tubes for directing respective light beams passing through the respective slits in said drum and the slots in the housing upon the said film so that the said film is exposed in areas passed by the slits.

4. A device of the type described comprising a rotatable cylindrical drum having a plurality of pairs of spaced axially extending and angularly aligned slits spaced equidistantly about the periphery thereof, a shaft attached to and extending through said drum and adapted to cause said drum to be rotated, a housing surrounding and supporting said drum through engagement with the shaft and having a pair of circumferentially extending slots therein adjacent to and extending along the path of movement of the slitted portions of said drum a distance substantially equal to the distance between successive pairs of slits, a holder for a sheet of sensitized film mounted on the housing over the slotted portions thereof, a tube extending axially inward within said drum from an opening in each end wall of said housing, and reflectors mounted in the inner ends of said tubes for directing respective light beams passing through the respective slits in the said drum and the respective slots in the housing upon the said film so that the said film is exposed in areas passed by the slits.

ROBERT E. WORSTELL.